US007111045B2

(12) United States Patent
Kato et al.

(10) Patent No.: US 7,111,045 B2
(45) Date of Patent: Sep. 19, 2006

(54) IMAGE DISTRIBUTION SYSTEM, AND IMAGE DISTRIBUTION METHOD AND PROGRAM THEREFOR

(75) Inventors: Masami Kato, Kanagawa (JP); Ken Sakakibara, Tokyo (JP); Yoshihisa Tadokoro, Tokyo (JP); Takashi Miyasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 782 days.

(21) Appl. No.: 09/884,063

(22) Filed: Jun. 20, 2001

(65) Prior Publication Data

US 2002/0023133 A1 Feb. 21, 2002

(30) Foreign Application Priority Data

Jun. 22, 2000 (JP) ............................. 2000-187794

(51) Int. Cl.
*G06F 15/16* (2006.01)
*G06F 15/177* (2006.01)
(52) U.S. Cl. ..................... 709/205; 709/224; 709/201
(58) Field of Classification Search ........ 709/200–205, 709/224, 217–227; 719/311, 318
See application file for complete search history.

(56) References Cited

U.S. PATENT DOCUMENTS 5,999,208 A * 12/1999 McNerney et al. ...... 348/14.08

6,064,772 A * 5/2000 Tanno et al. ................. 382/236
6,370,279 B1 * 4/2002 Paik ........................... 382/268
2002/0161590 A1 * 10/2002 Sakakibara et al. ............. 705/1

OTHER PUBLICATIONS

Y. Yokoo et al., "Human Face Detection Method Using Genetic Algorithm," Transactions of the Institute of Electrical Engineers of Japan, vol. 117-C, No. 9, pp. 1245-1252, Sep. 1997.

* cited by examiner

*Primary Examiner*—John Follansbee
*Assistant Examiner*—Haresh Patel
(74) *Attorney, Agent, or Firm*—Fitzpatrick, Cella, Harper & Scinto

(57) ABSTRACT

For distributing a user image corresponding to the user position in a virtual space, the invention provides a method of fetching the user image taken with a video camera into the main body of a computer (S1), judging the user position in the virtual space (S2), setting a large quantization coefficient in case of an office view (S3) but setting a small quantization coefficient and an even smaller quantization coefficients for a face area in other cases (S4), then compression encoding the image data with the designated quantization coefficient ((S5) and transferring the image data to a host server apparatus 12 through a network (S6). The user terminal receives images of other users from the host server apparatus (S7), expands the image data (S8) and displays the image data on a display apparatus 44 (S9).

11 Claims, 17 Drawing Sheets

IMAGE DISTRIBUTION SYSTEM, AND IMAGE DISTRIBUTION METHOD AND PROGRAM THEREFOR

BACKGROUND OF THE INVENTION

1. Field of the Invention

The present invention relates to an image distribution system, a method and a program therefor, and more particularly to an image distribution system in a virtual system formed on a computer network, a method and a program therefor.

2. Related Background Art

In organizations such as business firms, associations or public bodies, it is customary that an office space is secured by possession or by renting as the work space for employed laborers (hereinafter called workers) to be engaged in office works, marketing works or technical works not requiring a large facility, and the workers arrive and gather at the office space by public transportation or by private cars by a work start time and execute group work within the predetermined work time. Such office space is equipped with telephones, copying machines, facsimiles, computers, computer networks etc. for improving the efficiency of various works.

In the history of human beings, the habit of such group work is a relatively new phenomenon adopted for the efficient operation of the factories since the industrial revolution. In recent years, the drawbacks resulting from such group work such as conjection in commuting and air pollution caused by the increase of the private cars have become apparent, while the group work is becoming not essential for the organizations and for their workers as a result of availability of the communication infrastructure such as internet and of various communication technologies. Therefore the attention is being directed to the concept of dispersed work in which the workers belonging to an organization executes their jobs at their homes or in arbitrary locations close thereto whereby the objective of the organization is attained as a whole.

In general, for realizing the dispersed work in an organization such as a business firm, there is adopted a method of utilizing a room of the home of each worker as a working space (called home office), connecting plural home offices in distant locations by a communication channel and utilizing home-use communication terminals such as a telephone set and a facsimile apparatus and a communication application system. In this manner there is secured the communicating means among the workers. The communication channel can be composed, for example, of a public telephone network, an ISDN network or an internet exclusive line, and the communication application system can be composed of an e-mail system, a www (worldwide web) or a video conference system.

The worker may also utilize a satellite office or a telecottage prepared by the organization or the local community to which the worker belongs or, in case of a sales job or a maintenance job, the seat of a private car or a public transportation vehicle, to be used for visiting the customer, as a temporary office (called mobile office).

For the purpose of smoothly realizing such dispersed work, there have been proposed various system. FIG. 18 shows a client image in a multi-spot video conference provided by White Pine Software Inc., U.S. This system realizes, on personal computers, a real-time conference utilizing images among workers in distant locations.

The mutual exchange of the images among the dispersed workers through such system allows to realize so-called interactive awareness system thereby avoiding isolated or secluded feeling of the workers and stimulating active communication among the workers.

However, since the purpose of use is different in case the video conference system is utilized as a main communication tool and in case it is utilized as an interactive awareness system, the transmitted image results in various limitations in relation to the communication band and the convenience of use if the conventional system is applied for such purpose. More specifically, the user is required to adjust the camera setting and the compression parameter according to the function to be utilized.

SUMMARY OF THE INVENTION

An object of the present invention is to resolve all the drawbacks mentioned above or at least one thereof.

Another object of the present invention is, in order to resolve such drawbacks, to provide an image distribution system capable of constructing a virtual space system on a data network and mutually communicating an appropriate image according to the position of the user in the virtual space, and a method and a memory medium therefor.

The above-mentioned objects can be attained, according to the present invention, by an image distribution system composed of terminal apparatuses respective provided at plural users and a server apparatus connected to such plural terminal apparatuses through a communication channel for constructing a virtual space for distributing an image among the terminal apparatuses, wherein each of the terminal apparatuses comprises image obtaining means for obtaining an image of the user, transmission means for transmitting the image, obtained by the image obtaining means, to the server apparatus, reception display means for receiving and displaying the image transmitted from the server apparatus, designation means for designating the position of the user in the virtual space, and control means for controlling the image obtaining means according to the position of the user in the virtual space.

Still another object of the present invention is to provide an image of higher image quality.

The above-mentioned objects can be attained, according to the present invention, by an image distribution system composed of terminal apparatuses respective provided at plural users and a server apparatus connected to such plural terminal apparatuses through a communication channel for constructing a virtual space for distributing an image among the terminal apparatuses, wherein each of the terminal apparatuses comprises image obtaining means for obtaining an image of the user, transmission means for transmitting the image, obtained by the image obtaining means, to the server apparatus, reception display means for receiving and displaying the image transmitted from the server apparatus, and designation means for designating the position of the user in the virtual space, and the server apparatus comprises image process means for processing on the image transmitted from each of the terminal apparatuses, distribution means for distributing the image processed by the image process means to the terminal apparatuses, and control means for controlling the image process means according to the position of the user receiving the image distribution in the virtual space.

Still other objects of the present invention and the features thereof will become fully apparent from the following detailed description of the embodiments to be taken in conjection with the accompanying drawings.

DETAILED DESCRIPTION OF THE PREFERRED EMBODIMENTS

Now the present invention will be clarified in detail by preferred embodiments thereof, with reference to the accompanying drawings.

In the following description, the "position in virtual space" means, in case of constructing a virtual office space for example in a network, a position in a virtual space such as a "large office room" or a "conference room" in which the user is present (namely utilized by the user), and the function provided by the system (for example a function provided by the interactive awareness system or by the video conference) is determined according to such position.

Figure 1:
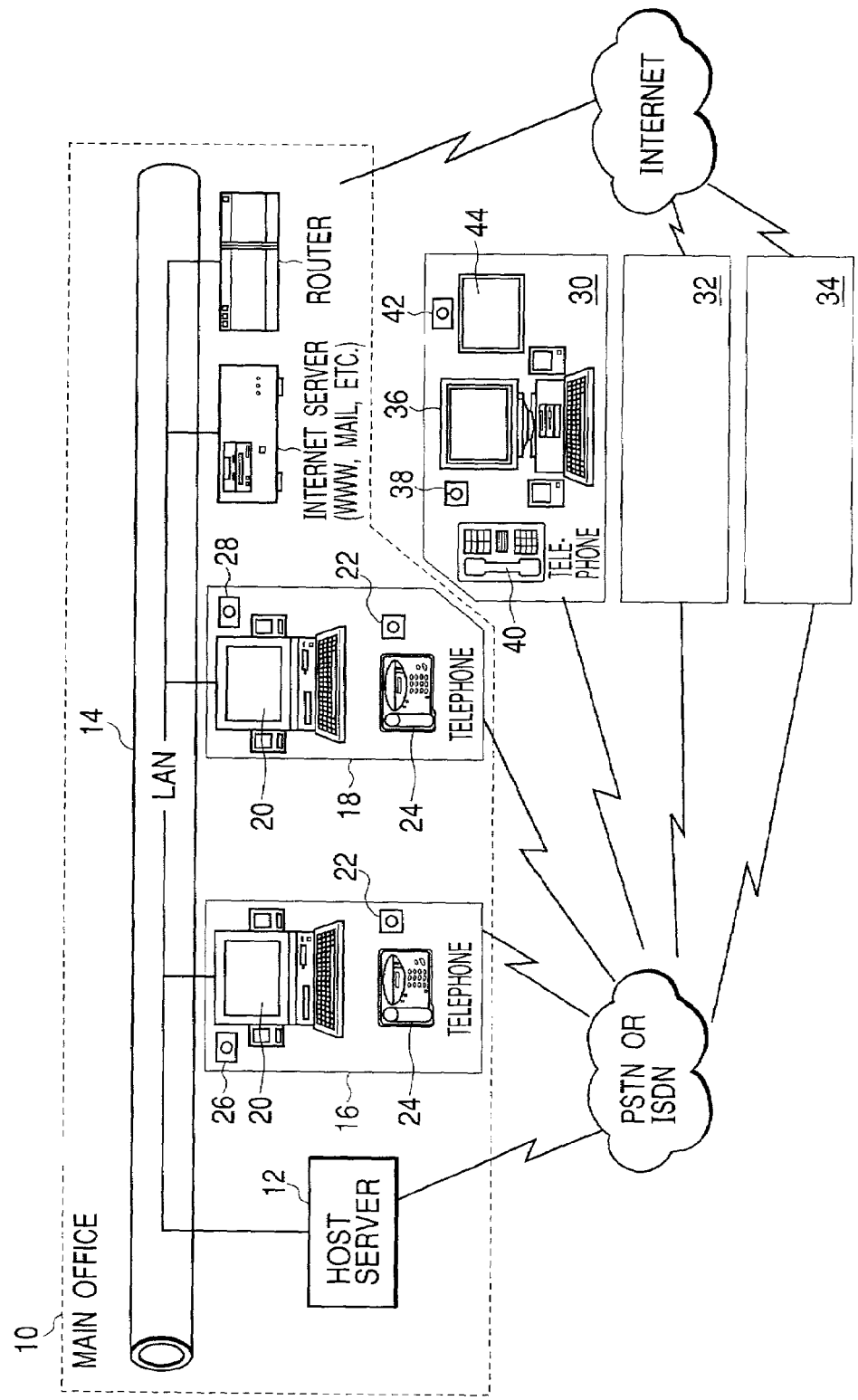
FIG. 1 is a schematic block diagram showing the configuration of a first embodiment.

FIG. 1 is a schematic block diagram showing the configuration of a virtual office system constituting an embodiment of the present invention.

In a main office 10 (for example the main office of an organization such as a business firm introducing the dispersed office system), there is installed a host server apparatus 12 which is connected to a LAN (local area network) 14 in the main office 10. User terminal apparatuses 16, 18 for the workers in the main office 10 are realized by combining a computer 20, a user terminal apparatus software 22, a telephone set 24, a video camera 26 and other devices. The telephone 24 can be connected to the host server apparatus 12 through a PSTN channel (public telephone channel) or an ISDN channel, and the computer 20 is connected to the host server apparatus 12 through the LAN 14.

User terminal apparatuses 30, 32, 34 for the workers in home offices are respectively realized by combining a computer 36, a user terminal apparatus software 38, a telephone set 40, a video camera 42, a virtual office display apparatus 44 and other devices. The telephone 40 can be connected to the host server apparatus 12 through a PSTN channel (public telephone channel) or an ISDN channel. The virtual office display apparatus 44 is connected to the computer 36.

Figure 2:
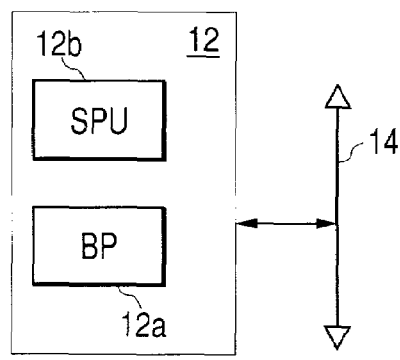
FIG. 2 is a view showing the hardware configuration of a host server apparatus 12.

FIG. 2 shows an example of the hardware configuration of the host server apparatus 12. A basic platform (BP) 12a is composed of a PC host server apparatus. A signal processing unit (SPU) 12b is a signal processing board composed for example of a high-performance DSP (digital signal processor). The SPU 12b is utilized for signal processing for example for image and voice at the server. The BP 12a is connected through a LAN board to the LAN 14 in the main office 10. Such configuration is already known and there may also be employed other configurations.

Figure 3:
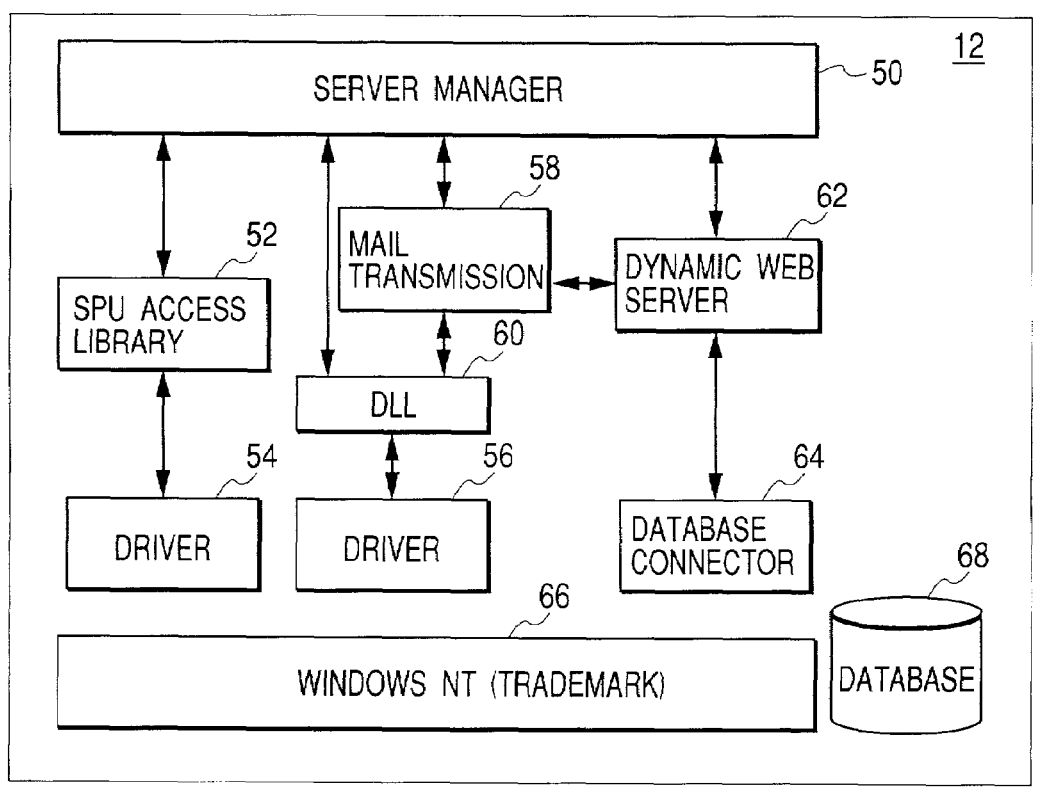
FIG. 3 is a view showing the software configuration of a host server apparatus 12.

FIG. 3 is a schematic block diagram showing the software configuration of the host server apparatus 12. The software installed in the host server apparatus 12 includes, for example, software programs developed with the C++ language or the like and already existing software programs, and, as the OS (operating system), there can be employed, for example, the Windows NT (trade name of Microsoft Inc., U.S.). In FIG. 3, there are shown a server manager 50, an SPU access library 52, drivers 54, 56, a mail transmission unit 58, a DDL (dynamic link library) 60, a dynamic web server 62, a database connector 64, Windows NT (trade name of Microsoft Inc., U. S.) 66, and a database 68.

Figure 4:
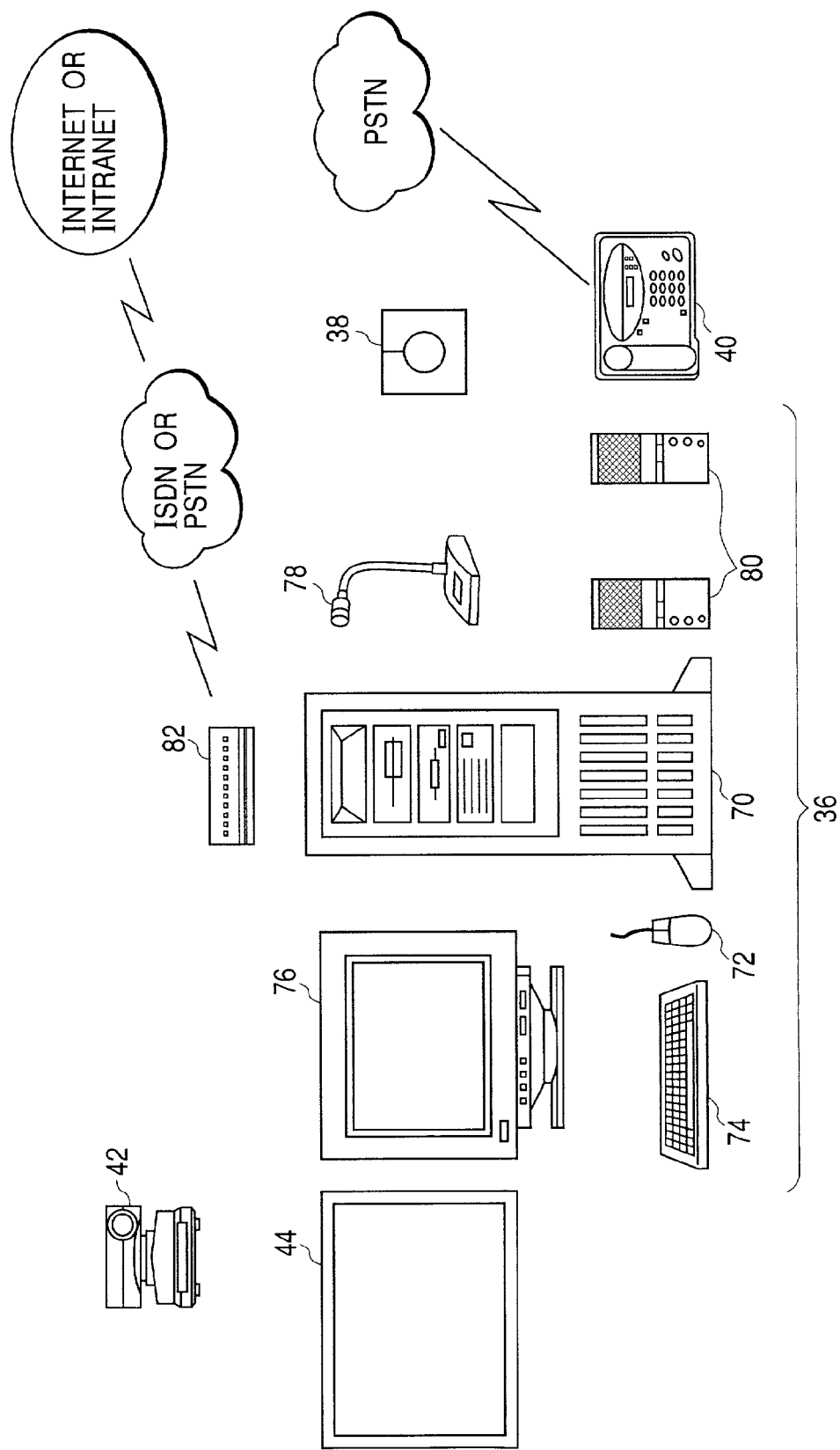
FIG. 4 is a view showing the configuration of devices in user terminal apparatuses 30 to 34.

FIG. 4 shows an example of the configuration of the user terminal apparatus 30. The computer 36 is composed, as already known, of a main body 70, a mouse 72, a keyboard 74, a display 76, a microphone 78, a speaker 80 and a modem (or a terminal adaptor) 82. The virtual office display apparatus 44 is composed of an image monitor apparatus such as a CRT display or a liquid crystal display and is connected to the main body 70 for displaying a virtual office image. The video camera 32 is also connected to the main body 70. The mouse 72, keyboard 74, display 76, microphone 78, speaker 80 and modem 82 are connected to corresponding input/output terminals of the main body 70.

Figure 5:
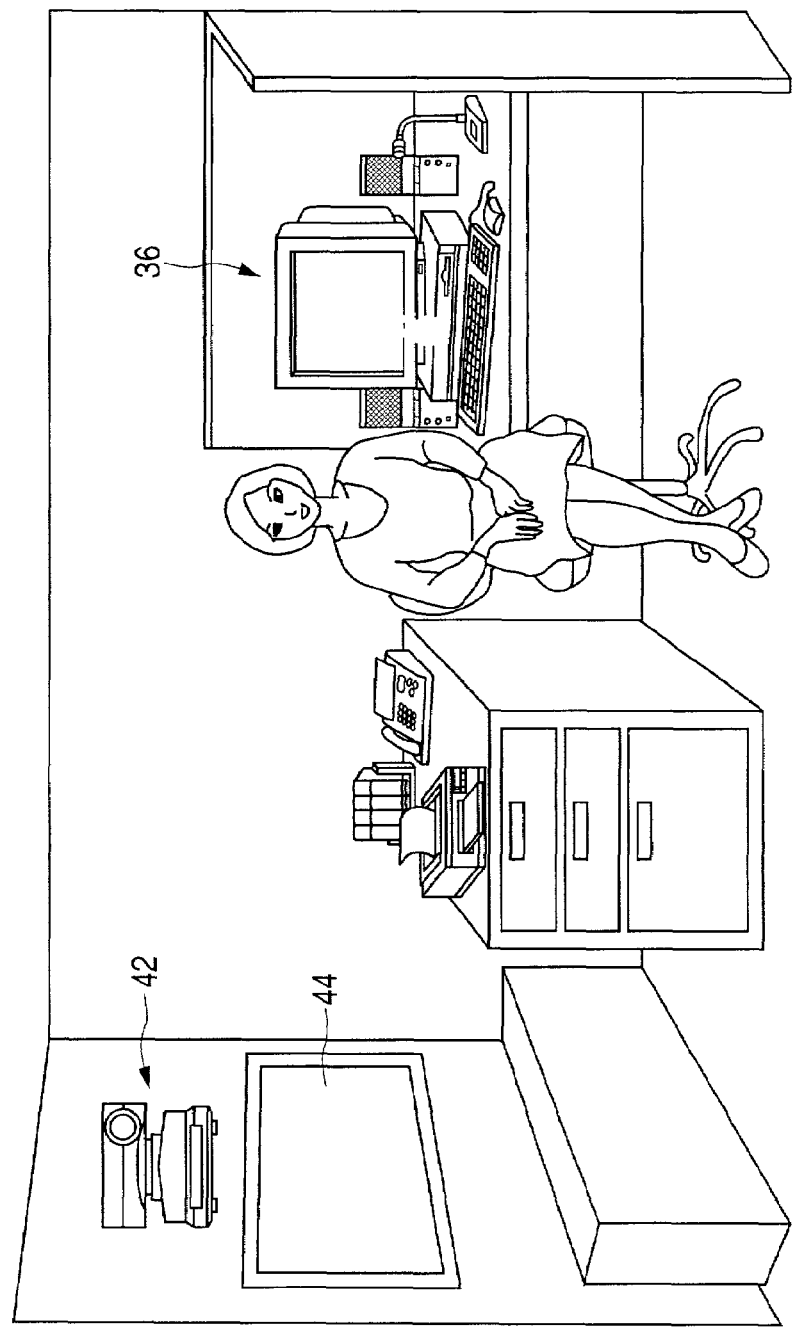
FIG. 5 is a view showing an example of arrangement of user terminal apparatuses 30 to 34.

FIG. 5 shows an example of installation of the devices shown in FIG. 4, in a home office. In this example, the virtual office display apparatus 44 is installed in a position different from that of the display 76 of the computer 36 to be used by the user for the works. Thus, when the user utilizes the main body 70 of the PC, the display area for the work is not hindered by the display for showing the office space thereby providing a comfortable environment, and, if the virtual office display apparatus 44 becomes larger, there can be realized an atmosphere closer to the reality.

In the following there will be explained the function of the present embodiment. For the purpose of simplicity, it is assumed that the users of the home offices have already started to work by completing the connection to the host server apparatus 12 utilizing the respective user terminal apparatuses 30, 32, 34.

Figure 6:
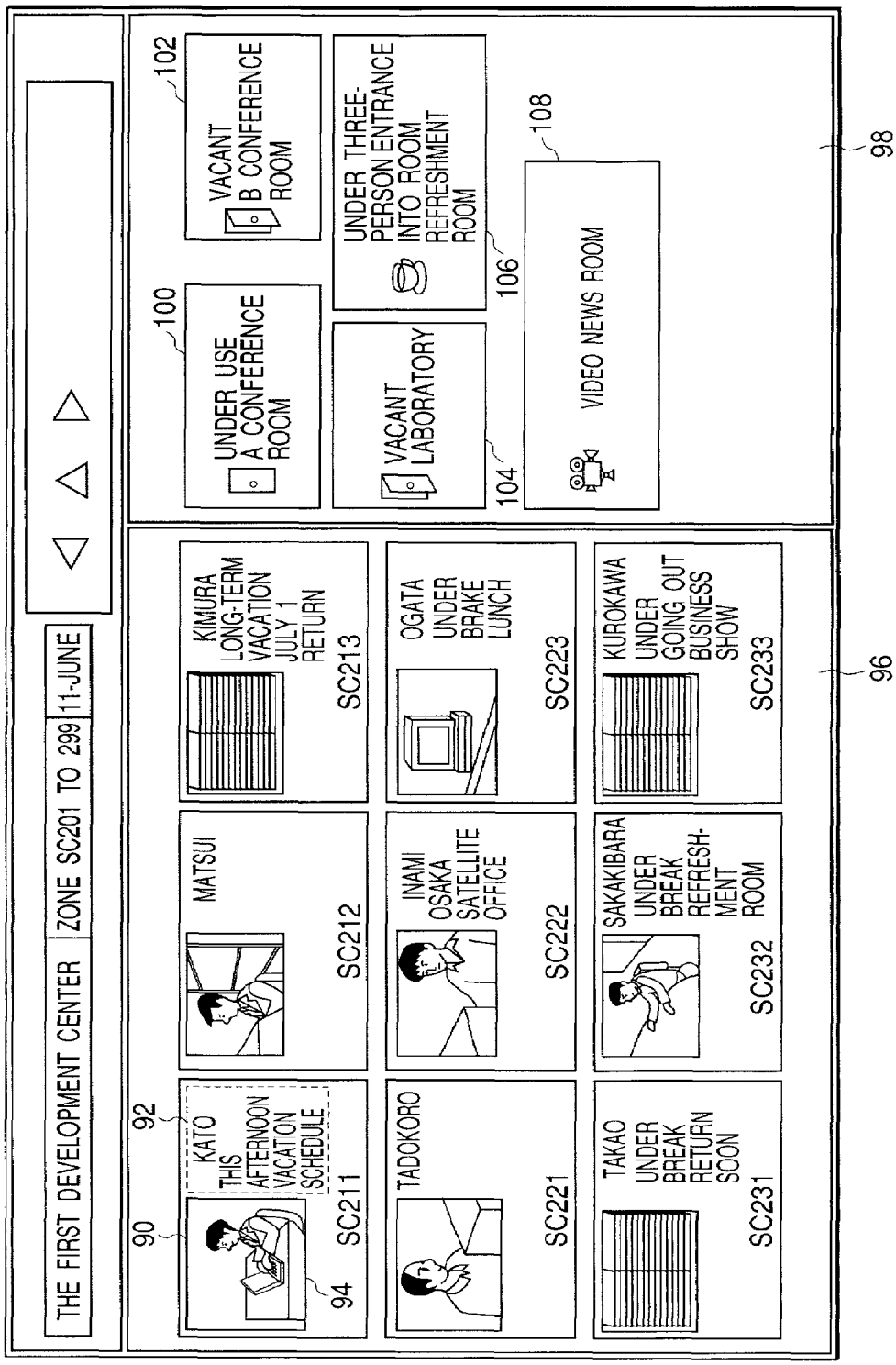
FIG. 6 is a view showing an example of an image called office view, displayed on a virtual office display apparatus 44.

FIG. 6 shows an image, called office view, displayed on the virtual office display apparatus 44. There are shown an image 90 showing the state of work of another user, a work state data display portion 92 for displaying the work state data of such user and comments by text information, and private office space 94 of such user. These three displays in combination constitute a virtual private office of the user. FIG. 6 shows nine private offices on a same image, but the number of such private offices may be selected larger or smaller. The space for displaying such private offices is called a private office area 96. A space between the private offices is a virtual corridor. The user work state image 90, displayed as a part of the private office, is taken by the camera 42 provided in the user terminal apparatus 30 to 34 used by such user.

At the right-hand side of the private office area 96, there is provided a common area 98, in which displayed are icons 100=108 respectively representing a conference room A, a conference room B, a laboratory, a refreshing room and a video news room.

When the worker is working, the virtual office display apparatus 44 displays the office view as shown in FIG. 6. When the user is positioned in the office area in the virtual space, the system functions as an interactive awareness system so that the exchanged image can be of such content as to show the outlined state of the user.

Figure 7:
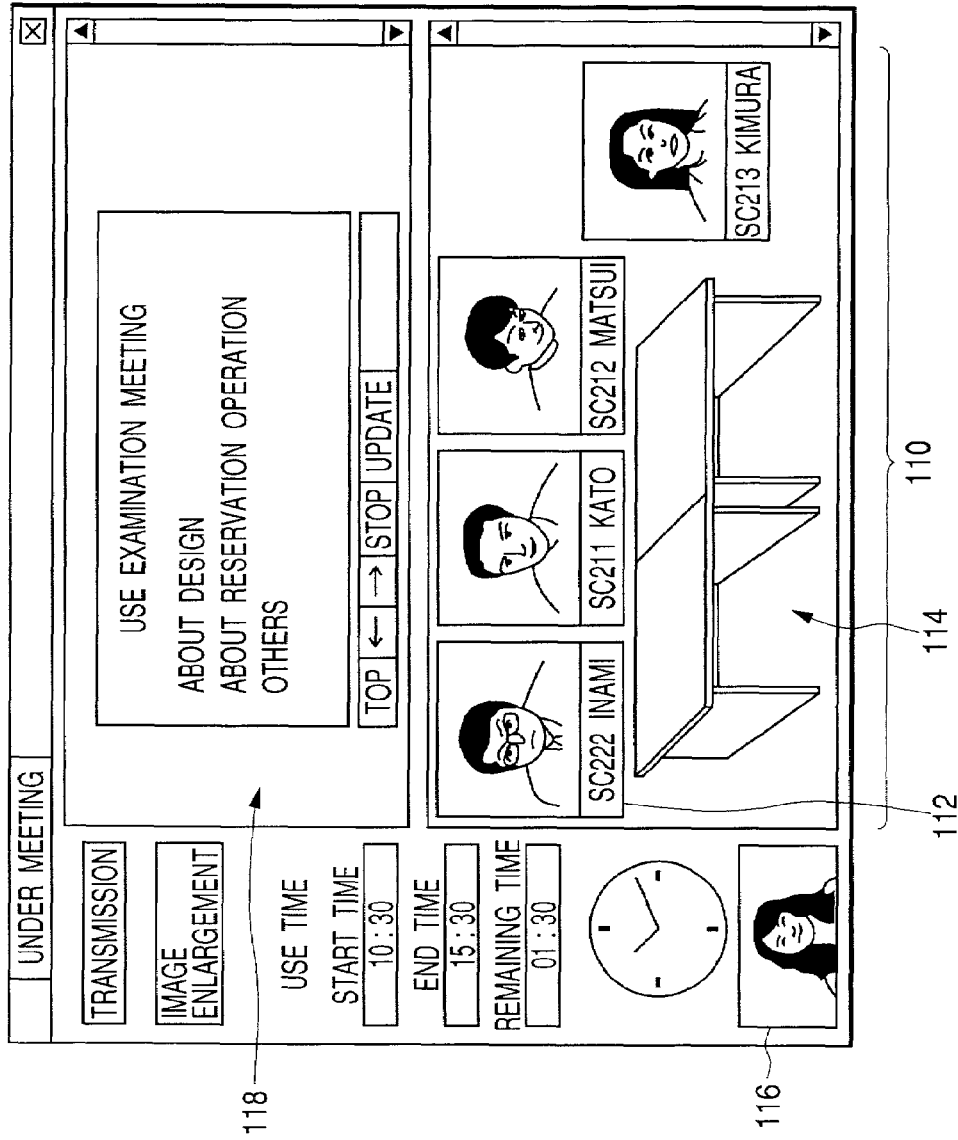
FIG. 7 is a view showing an example of a virtual office display image called conference room.

FIG. 7 shows an example of the virtual office display image called conference room. When the user clicks an conference room icon 100 on the office view, the display shifts to the conference room on the virtual space, as shown in FIG. 7. In a conference room display area 110 there are displayed images 112 of other participants and an image 114 schematically showing a table. An image 116 of the user is taken by the camera provided in the user terminal used by such user. A reference display area 118 displays references to be used at the conference and registered in advance by the participants.

Each participant executes the conference by looking at the image and the reference, utilizing unrepresented voice conference tool (also called voice chat tool) and character conference tool (also called text chat tool).

The voice conference tool includes a voice conference client software (voice telephone conference software for TCP/IP network based on the ITU-T standard H.323) provided in the user terminal apparatus and a voice conference server software (multi-spot voice telephone conference software for TCP/IP network based on the ITU-T standard H.323) provided in the host server apparatus, and, when these softwares are activated, the users can have a voice conference in multiple locations utilizing the microphone and the speaker provided in each user terminal apparatus.

The text conference tool includes a text conference client software (text conference client software for TCP/IP network based on the IRC (internet relay chat) standard) provided in the user terminal apparatus and a text conference server software (multi-spot text conference server software for TCP/IP network based on the IRC conference) provided in the host server apparatus, and, when these softwares are activated, the users can have a text conference in multiple locations utilizing the keyboard of each user terminal apparatus and a text chat window displayed simultaneously on the display separately from the conference room image (FIG. 7).

The voice conference tool, the text conference tool and the multi-user game tool can be based on the known technologies, and will not be explained further since they are not related with the present embodiment.

When the user is present in the conference room, it is important, for attaining smooth communication, to clearly transmit the face of the participant, thereby enabling to recognize the expression of each participant.

Figure 8:
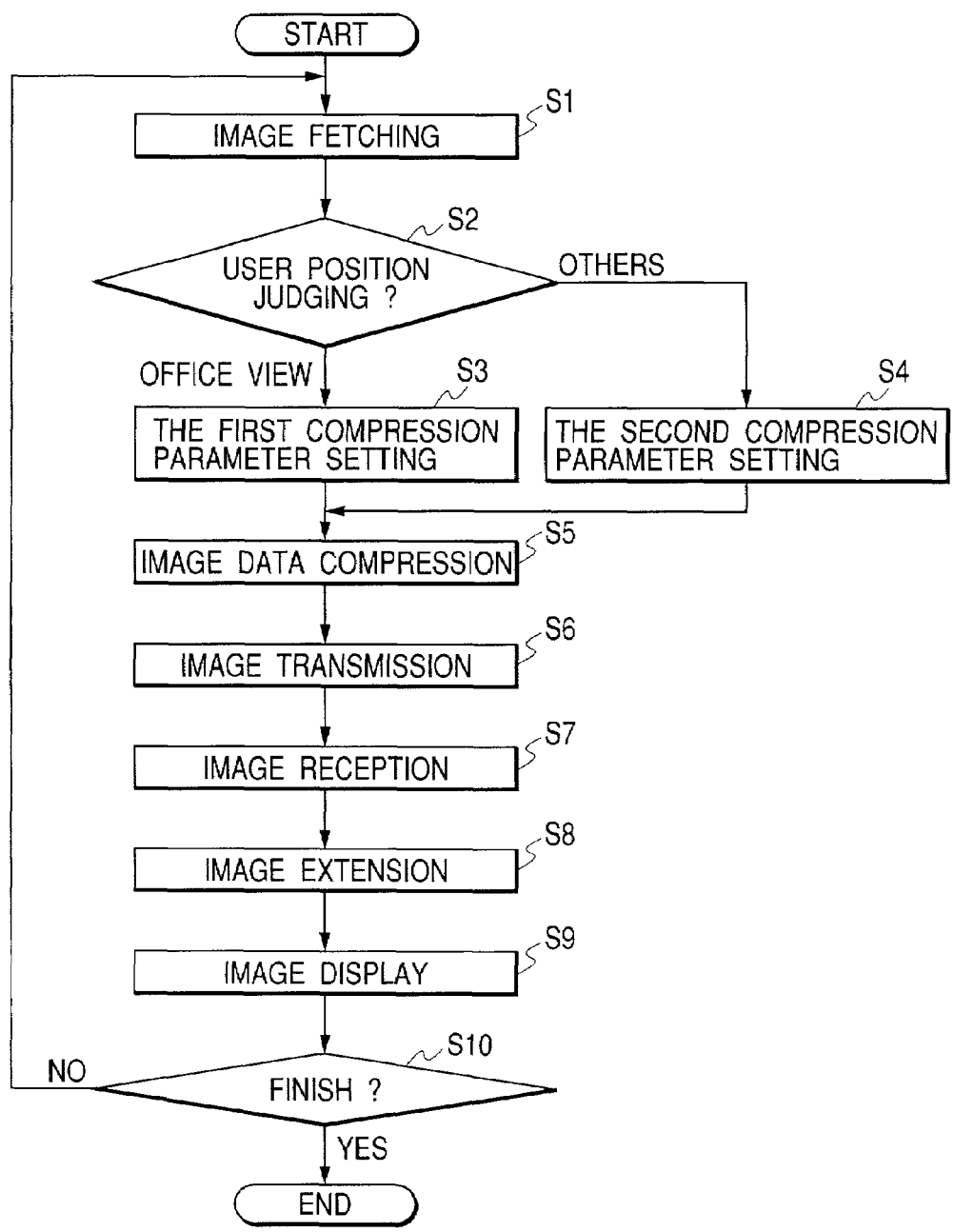
FIG. 8 is a flow chart showing operations relating to obtaining, displaying of image data and image control in a user terminal apparatus.

FIG. 8 is a flow chart showing the operations relating to the obtaining and displaying image data and image control in the user terminal apparatus. In the following there will be explained the image distribution control operation of the virtual office system of the present embodiment, with reference to the flow chart shown in FIG. 8.

The image taken by each video camera 42 is taken into the main body 70 of the computer by a video input device thereof, as image data of QCIF format (176 ×144 pixels) (S1). Then the position of the user in the virtual space is judged (S2), and, in case of the office view (namely in case the user is present in the virtual large office space), there is set a first compression parameter (S3), but, if otherwise, there is set a second compression parameter (S4). The compression parameter is assumed to be a quantization coefficient. More specifically, in case the user is present in the office view, namely in case the user utilizes the present system as an interactive awareness system, there is selected a large quantization coefficient (S3), but, in other cases, for example if the user is present in the conference room, there is selected a small quantization coefficient, and a face area is detected for example a method reported by Yokoo and Ogiwara, "Extraction of plural face areas from a natural image utilizing a hereditary algorithm", Den-Gaku-Ron 117-C, 9, pp. 1245–1252((1997) and a smaller quantization coefficient is assigned to the face area (S4).

The image data are compression encoded by an image encoding method such as JPEG or H.263, utilizing the designated quantization coefficient (S5). For example, in case of JPEG compression, the transformation coefficients obtained by color space conversion and DCT are quantized by the designated quantization coefficient and then compression by the Huffman encoding. The compressed image data are promptly transferred through the network to the host server apparatus 12 (S6).

The user terminal receives the images of other users from the host server apparatus 12 (S7), expands the image data of such images (S8) and displays them on the display apparatus 44 (S9).

These operations are repeated until the user instructs the end of the process (S10).

In the present embodiment, the taken image is compressed with an automatically predetermined quantization coefficient, according to the position of the user in the virtual space. In case the user utilizes the interactive awareness function, the compression is executed with the large quantization coefficient to display other users as rough images. On the other hand, in case of the conference in the virtual conference room, the images of other users are displayed with a high definition. Therefore, in case of utilizing the interactive awareness function, the data amount of the images of other users are reduced so that the communication band can be utilized efficiently. Also high-definition images can be exchanged in case of utilizing the communicating function principally based on voice and text, such as the conference. It is also possible to show the face area with a higher definition in case of utilizing the active communicating function, utilizing the face recognition technology.

Such control of the compression rate according to the function corresponding to the position in the virtual space allows to transmit the optimum image while efficiently utilizing the communication band.

Figure 9:
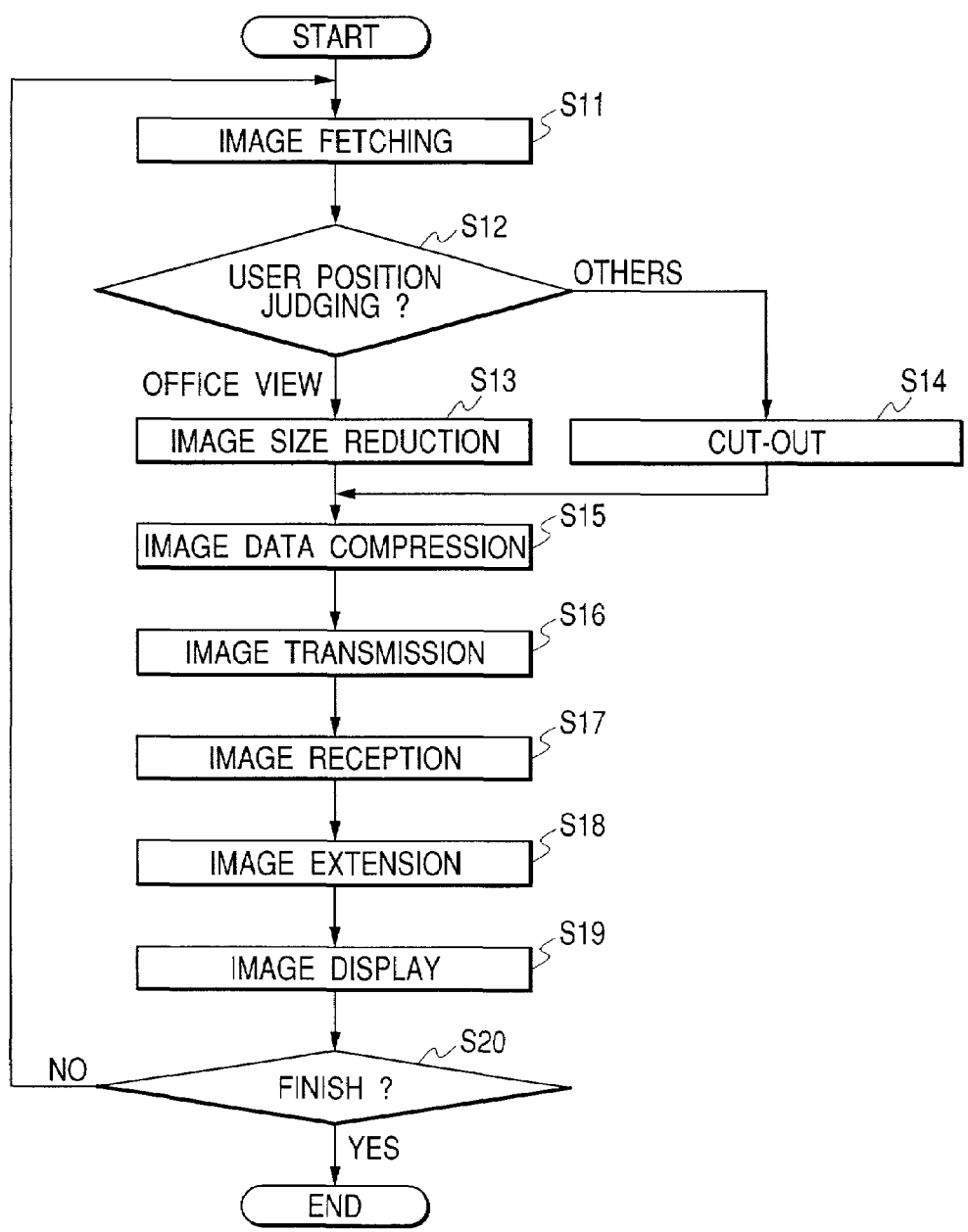
FIG. 9 is a flow chart showing another example of the operations of the embodiment.

In the example shown in FIG. 8, the image compression rate is switched according to the user position, but it is also possible to switch either to cut out a principal portion of the taken image or to reduce the size of the taken image according to the user position. FIG. 9 shows a flow chart of such variation.

A field wider than the image to be actually transmitted is taken by the video camera 42, and the data of such taken image are fetched into the main body 70 of the computer by the video input device thereof (S11). In this operation, there is for example taken a full scene indicating the state of the user.

Then the position of the user in the virtual space is judged (S12), and, in case the user is present in the office view (namely in case the user utilizes the present system as an interactive awareness system, the fetched image is linearly reduced to a size corresponding to the transfer rate of the communication channel (S13), but, in other cases, for example if the user is present in the conference room, an area principally containing the user face is cut out from the fetched image (S14). The cut-out area may be predetermined by the user, or the face area of the user may be automatically detected and cut out based on the face recognition technology as explained in relation to FIG. 8.

Figure 10B:
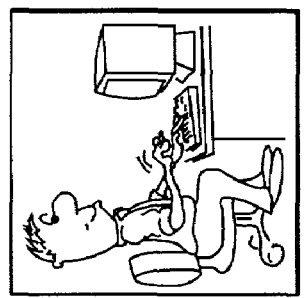
FIGS. 10A, 10B and 10C are views showing an example of image processing in the operations shown in FIG. 9.
Figure 10C:
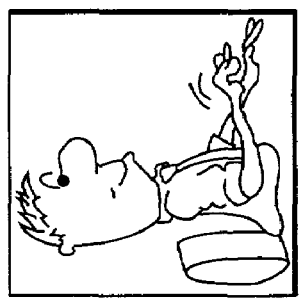
Figure 10A:
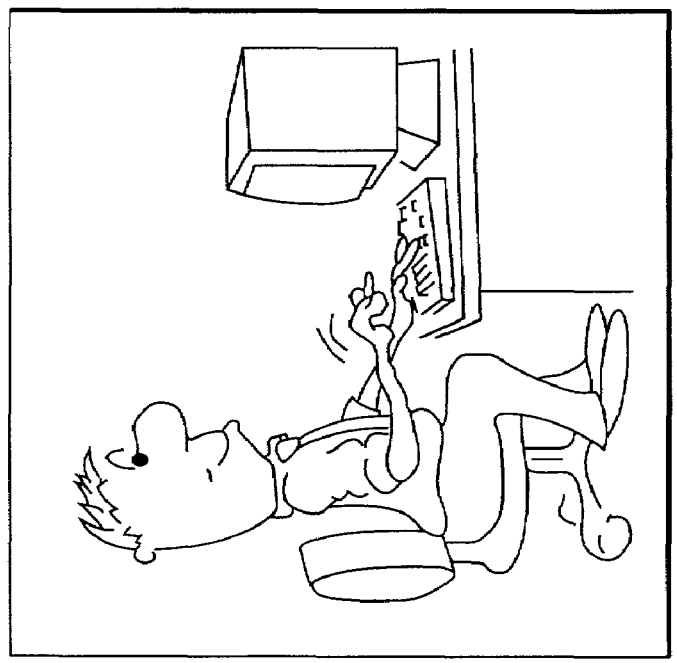

FIGS. 10A to 10C show examples of image reduction (S13) and face cut-out (S14). FIG. 10A indicates a taken image, while FIG. 10B shows an image reduced to a desired size from the image shown in FIG. 10A and FIG. 10C shows an image obtained by cutting out a face area of a desired size from that shown in FIG. 10A.

Such reduced image (S13) or cut-out image (S14) is compression encoded by an image encoding method such as JPEG or H.263 (S15), and the compressed image data are promptly transferred through the network to the host server apparatus 12 (S16). The user terminal receives the images of other users from the host server apparatus 12 (S17), expands the image data of such images (S18) and displays them on the display apparatus 44 (S19).

These operations are repeated until the user instructs the end of the process (S20).

The convenience of use can be improved since it is automatically selected either to reduce the image or to cut out the predetermined portion so as to enable recognition of the user face, according to the user position in the virtual space. For example in case the user utilizes the interactive awareness function, the full-scene images of other users are received as rough images. On the other hand, in case of the conference in the virtual conference room, other users are displayed by images principally composed of the faces thereof. Therefore, in case of utilizing the awareness mode, it is possible to understand the status of other user, and, in case of utilizing the function principally based on communication such as the conference, satisfactory communication can be realized by high-definition images principally based on the faces.

Such control of the transmitted image area according to the function corresponding to the position in the virtual space allows to realize transmission control of the optimum image according to the purpose of use.

Figure 11:
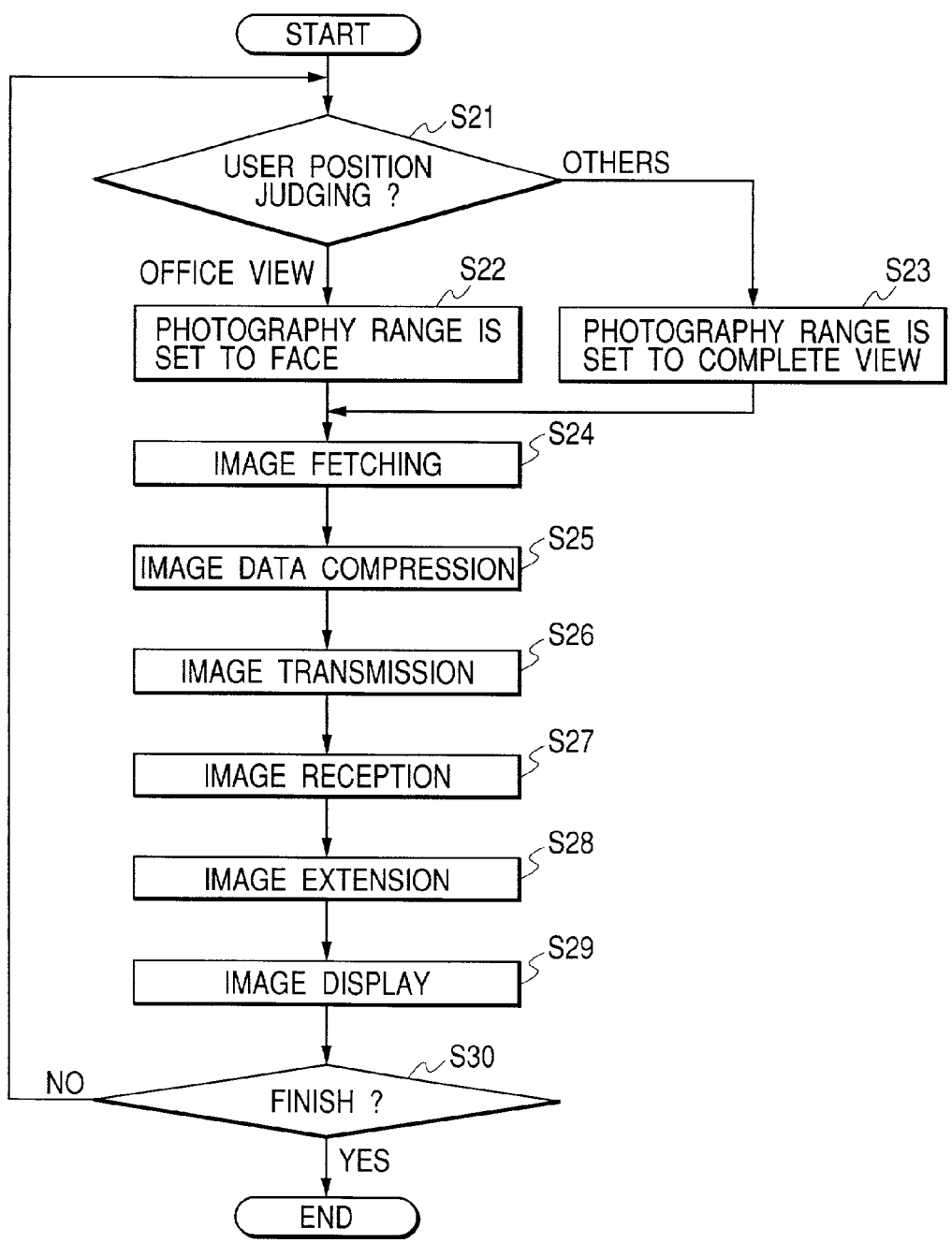
FIG. 11 is a flow chart showing a 3rd example of the operations of the embodiment.

FIG. 11 is a flow chart showing a 3rd example of the operations of the present embodiment. The user terminal judges the position of the user in the virtual space (S21). In case the user is present in the office view (S21) namely in case the user utilizes the interactive awareness function, the zooming and the image taking direction of the camera 42 are so controlled as to take a full scene indicating the state of the user (S22). In other cases (S21), the zooming and the image taking direction of the camera 42 are so controlled as to take a narrow area principally containing the user face (S23). The camera 42 can be composed of a camera in which the panning, tilting and zooming can be controlled externally. The image taking area may be predetermined by the user, or automatically selected. Particularly in case of taking an image principally consisting of the user face, the image taking area may be determined by automatically detecting the face area of the user utilizing the face recognition technology as already explained in relation to FIG. 8.

The image is taken with thus set image taking area and is fetched into the main body (S24). The fetched image is compression encoded by an image encoding method such as JPEG or H.263 (S25), and the compressed image data are promptly transferred through the network to the host server apparatus 12 (S26). The user terminal receives the images of other users from the host server apparatus 12 (S27), expands the image data of such images (S28) and displays them on the display apparatus 44 (S29).

These operations are repeated until the user instructs the end of the process (S30).

As explained in the foregoing, the image taking area is selected according to the user position in the virtual space, and the full-scene image is transmitted in case the user utilizes the interactive awareness function, but the image principally composed of the face is transmitted in other cases. Therefore it is possible to understand the state of other users in case of the awareness mode, and satisfactory communication is made possible by the high-definition image principally composed of the face in case of the function mainly for communication such as the conference. Also the process load is reduced since the image taking area can be selected solely by the camera control and does not required any particular image processing.

Such control of the image taking device according to the function corresponding to the position in the virtual space allows to realize transmission control of the optimum image according to the purpose of use.

Figure 12:
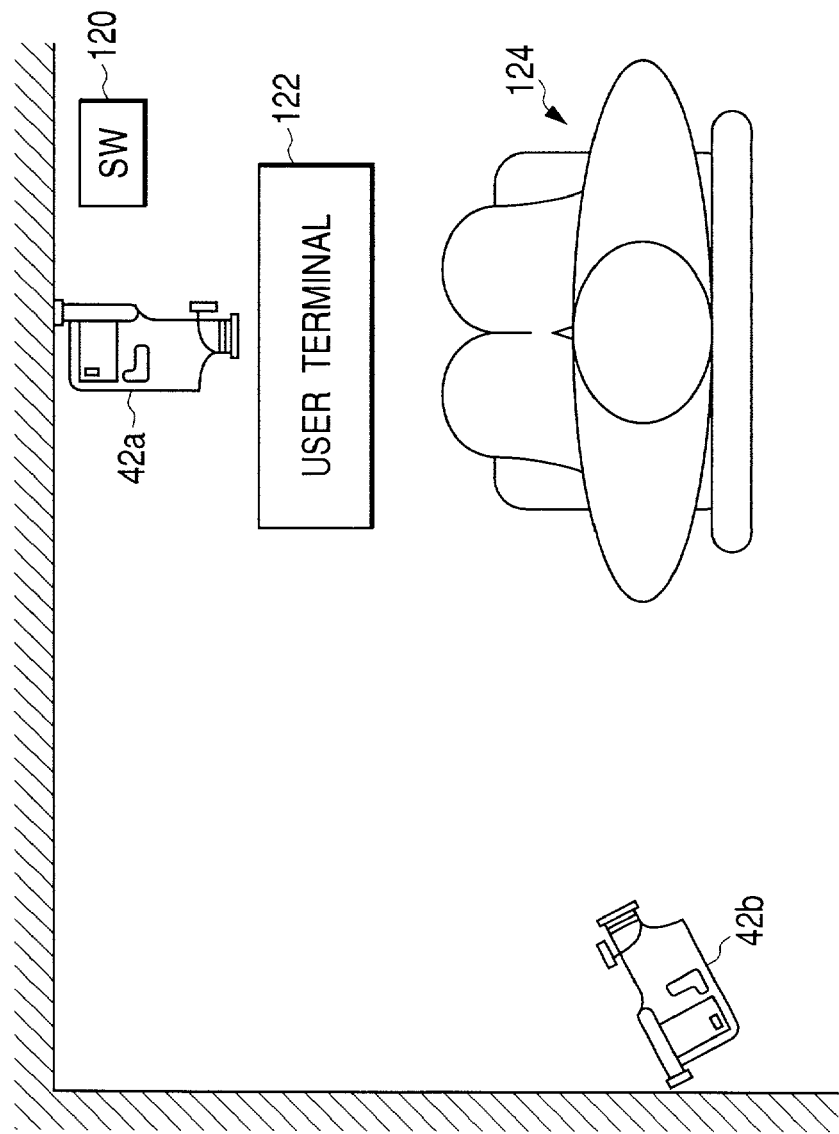
FIG. 12 is a plan view showing the camera arrangement in case of setting plural video cameras.

As shown in a plan view in FIG. 12, the single video camera 42 may be replaced by a video camera 42a positioned in front of the user and adapted to take an image principally composed of the user face, and a video camera 42b taking the full scene where the user is present. There are also shown a video switching unit 120 for switching the outputs of the video camera 42a, 42b, a user terminal 122 and a user 124. The video switching unit 120 is connected for example to a serial interface of the user terminal 122 and is controlled thereby.

Figure 13:
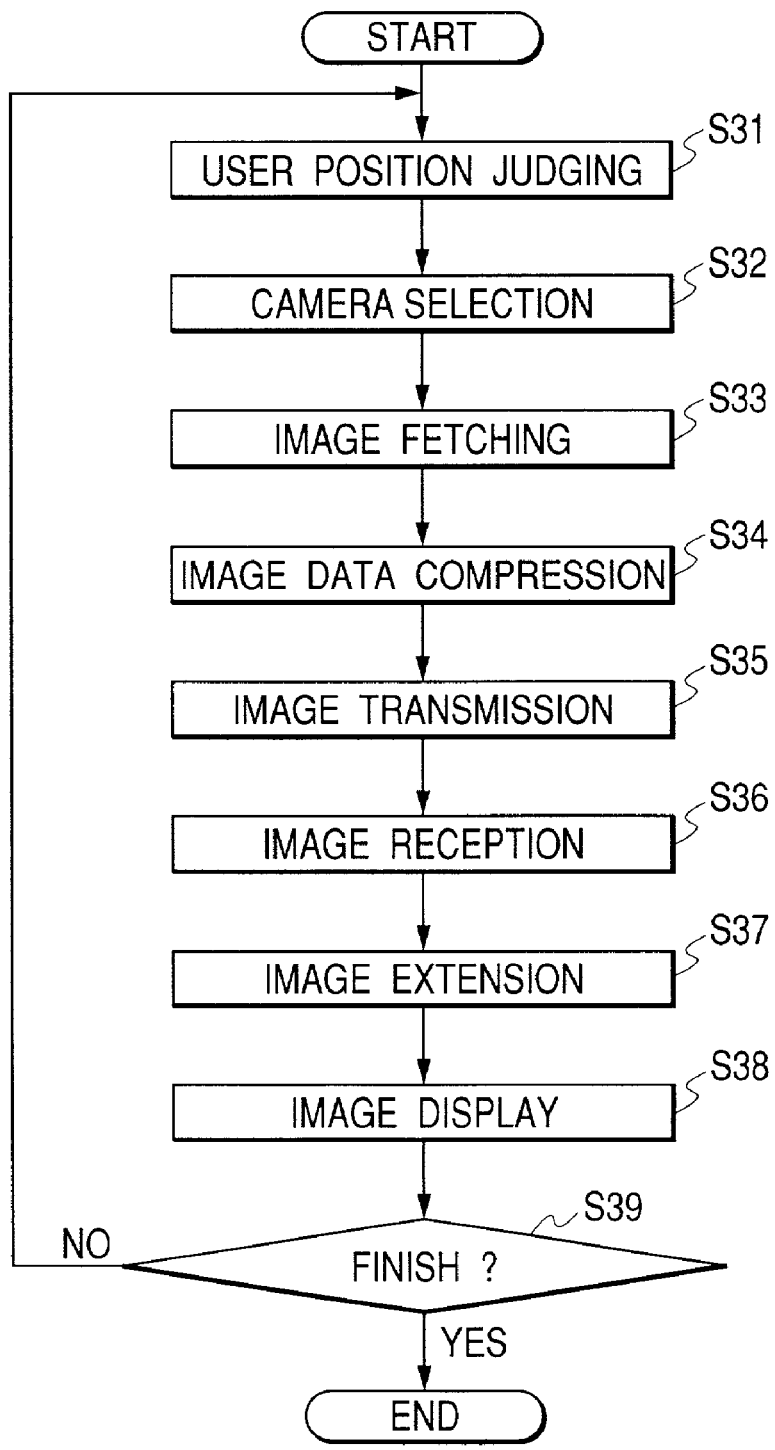
FIG. 13 is a flow chart showing the operations in case two video cameras are set.

FIG. 13 is a flow chart showing the operations in case the two video cameras 42a, 42b are provided as shown in FIG. 12.

The user terminal 122 judges the position of the user in the virtual space (S31), and switches the video switching unit 120 according to the result of the judgment, thereby selecting the camera 42a or 42b to be used (S32). In case the user is present in the office view, namely in case the user utilizes the interactive awareness function, there is selected the camera 42b for taking the full scene indicating the state of the user. In this case, the full scene is taken from the back in order to reduce the psychological resistance of the user. On the other hand, in case the user is in the conference room, there is selected the camera 42a for taking the image of the narrow area principally composed of the user face.

The image taken with the selected video camera 42a or 42b fetched into the main body 70 (S33). The fetched image is compression encoded by an image encoding method such as JPEG or H.263 (S34), and the compressed image data are promptly transferred through the network to the host server apparatus 12 (S35). The user terminal receives the images of other users from the host server apparatus 12 (S36), expands the image data of such images (S37) and displays them on the display apparatus 44 (S38).

These operations are repeated until the user instructs the end of the process (S39).

Such selection of the cameras 42a, 42b according to the user position in the virtual space allows to distribute the image showing the desired area. For example, the full scene of the user is distributed as a rough image in case the user utilizes the interactive awareness function, but the image principally showing the user face is displayed in case of the conference in the virtual conference room. Therefore, it is possible to understand the state of other users in case of the awareness mode, and the images principally composed of faces, suitable for communication are exchanged in case of the function mainly for communication such as the conference.

As explained in the foregoing, the load of signal processing can be reduced since the image taking area is controlled solely by the camera selection and do not require any particular signal processing. Also the use of plural cameras increases the freedom in setting the image taking angle corresponding to the function to be used, and the convenience of use can be improved particularly in reducing the psychological burden of the user.

Figure 14:
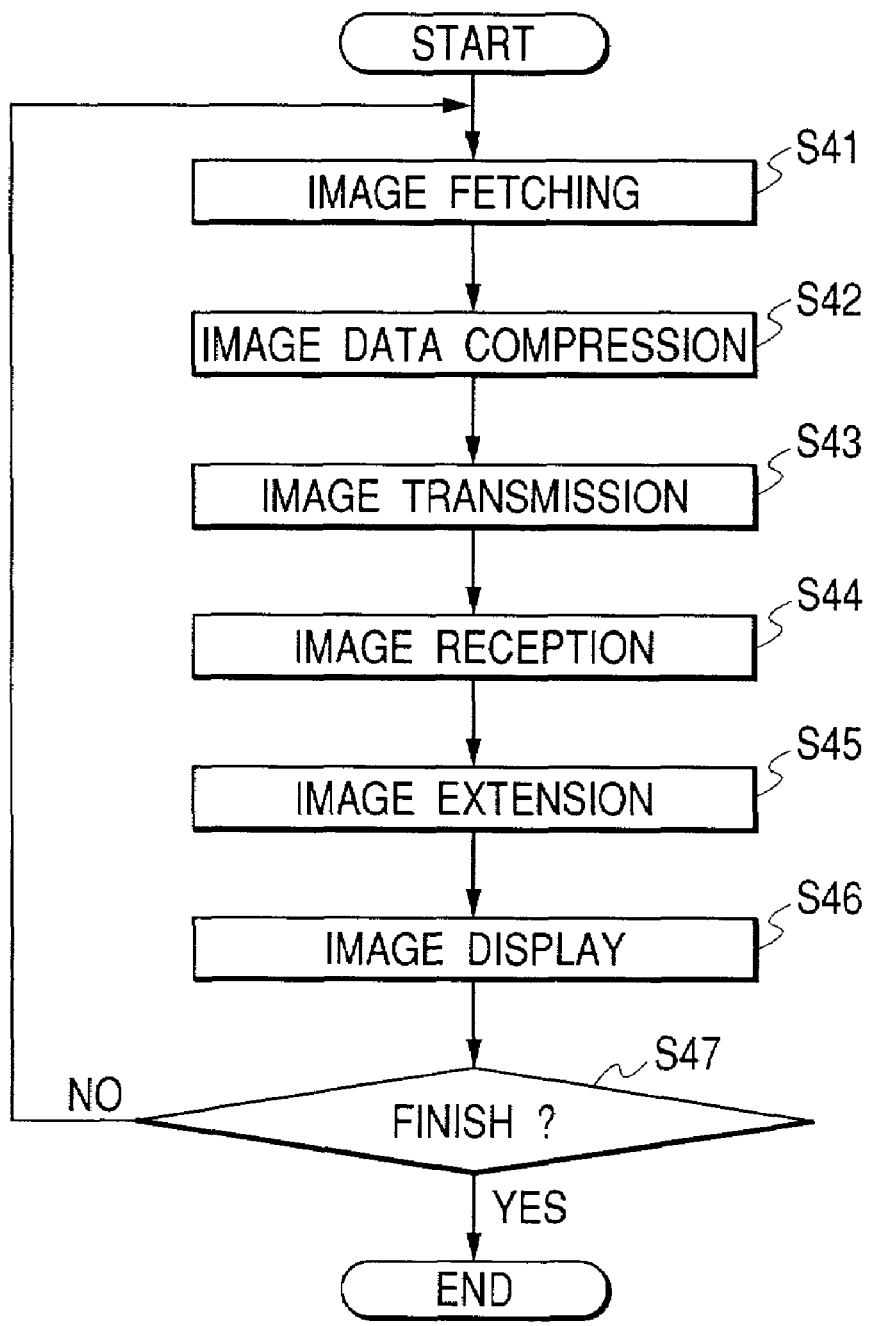
FIG. 14 is a flow chart showing the operations of a user terminal in case a process according to the user position is executed in a host server apparatus 12.
Figure 15:
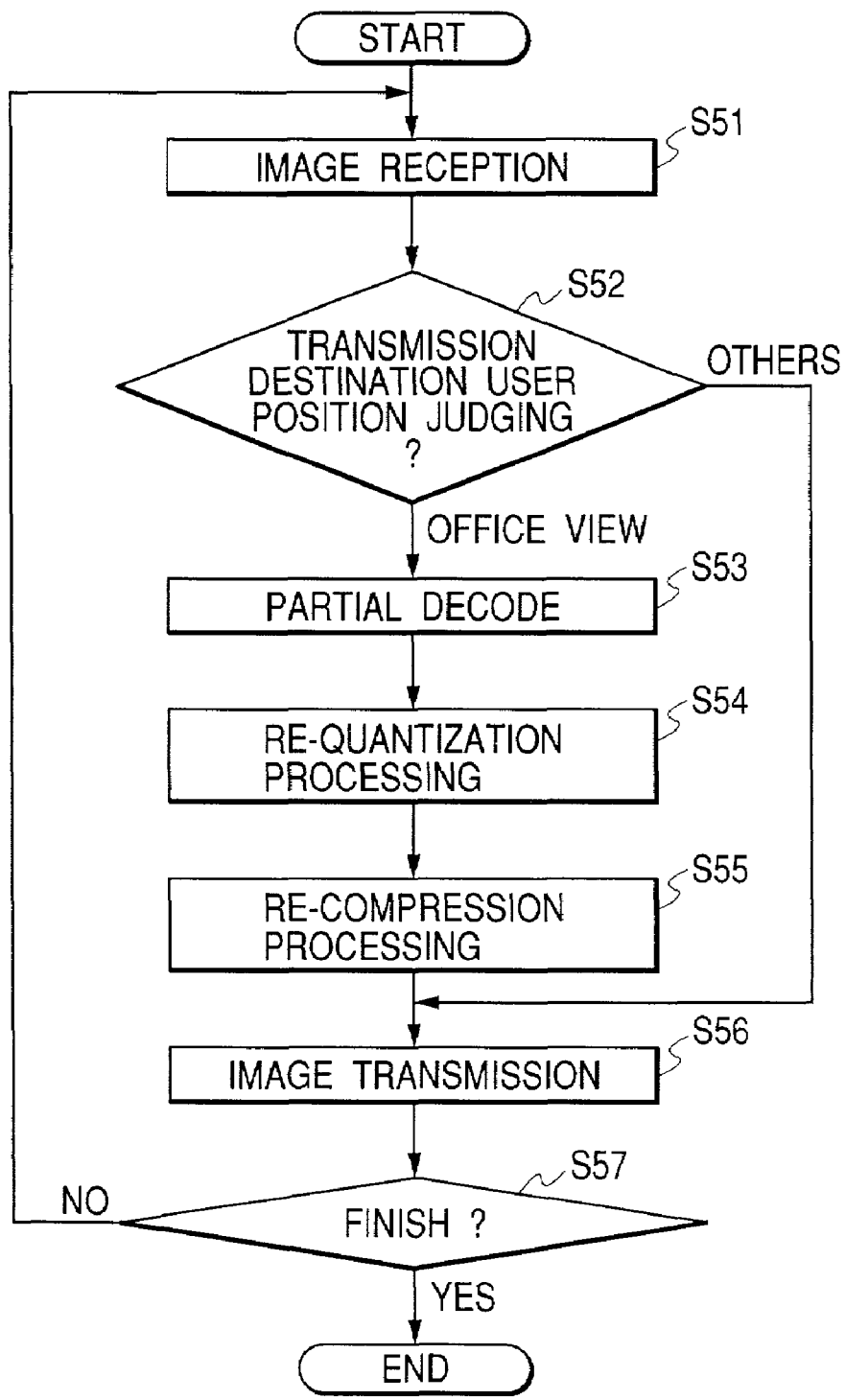
FIG. 15 is a flow chart showing the operations of the host server apparatus 12 corresponding to FIG. 14.

In the following there will be explained an example of process according to the user position by the host server apparatus 12. FIG. 14 is a flow chart showing the operations of the user terminal, and FIG. 15 is a flow chart showing the operation of the host server apparatus 12.

The image taken by each video camera 42 is taken into the main body 70 of the computer by a video input device thereof, as image data of QCIF format (176 ×144 pixels) (S41). The fetched image data are compression encoded by an image encoding method such as JPEG or H.263 (S42), and are transferred through the network to the host server apparatus 12 (S43).

The host server apparatus 12 receives the image transmitted from the client (S51), and judges the position of the user in the virtual space in the transmitting terminal (S52). In case the user of the transmitting terminal is present in the conference room (S52), the received image data are directly transmitted to the user (S56). In case the user of the transmitting terminal is present in the office view (S52), the received image data are partially expanded. For example, in case of the image data compressed with the JPEG method, the decoding is executed by the Huffman decoding and the inverse DCT to the DCT coefficients. Then the restored DCT coefficients are again quantized with a quantization coefficient larger than that at the compression encoding (S54), and are compression encoded again by entropy encoding such as Huffman encoding (S55). The host server apparatus 12 distributes the image data thus subjected to partial decoding and recompression to the user terminal through the network (S56).

The user terminal receives the images of other users from the host server apparatus 12 (S44), expands the image data of such images (S45) and displays them on the display apparatus 44 (S46).

The user terminal repeats the process of the foregoing steps S41 to S46 until the user instructs the end of the process (S47). The host server apparatus 12 repeats the process of the foregoing steps S51 to S56 until the user instructs the end of the process (S57).

In the operations shown in FIGS. 14 and 15, the host server apparatus 12 recompresses the image data in adaptive manner according to the user position in the virtual space. For example, in case the user utilizes the interactive awareness function, the host server apparatus 12 recompresses the image data with the large quantization coefficient, but, in case of the conference in the virtual conference room, the image data are transmitted without recompression. Therefore, in case of utilizing the interactive awareness function, the user receives the rough images of other users, but, in case of the virtual conference, receives the high-definition images of other users. In this manner, it is rendered possible to reduce the data amount of other users thereby effectively utilizing the communication band in case of the awareness mode, and to distribute the high-definition image in case of utilizing the function principally for communication such as the conference.

The control of the quantization coefficient by the server 12 allows to distribute optimum image data to each user. More specifically, it is possible to distribute the high-definition image data only to the user present in the conference room and to distribute the highly compressed image, including the images of other users present in the conference room, to the user present in the office view.

The control of the quantization coefficient in the server according to the position in the virtual space allows to realize the optimum image distribution while achieving effective utilization of the communication band.

Figure 16:
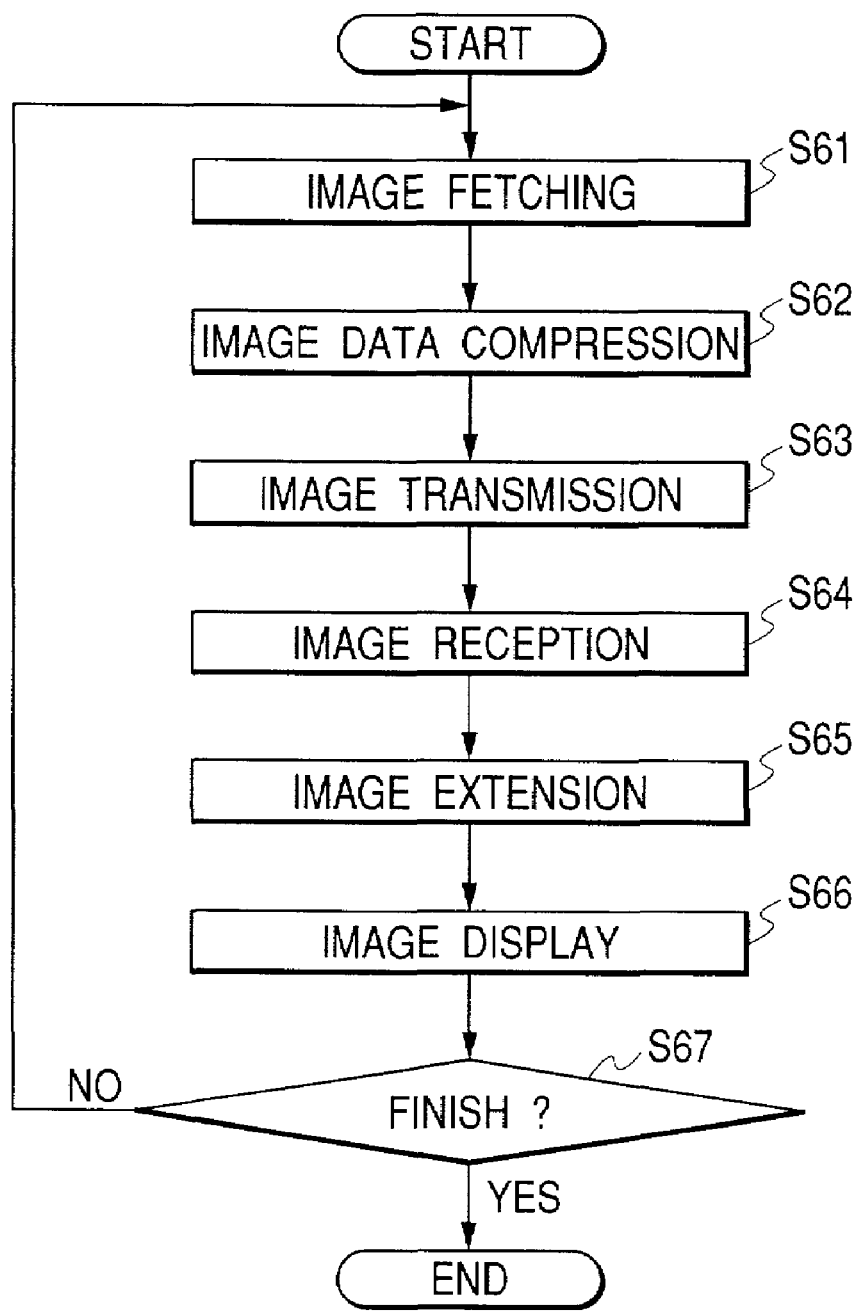
FIG. 16 is a flow chart showing the operations of a user terminal in another example in case the process according to the user position is executed in the host server apparatus 12.
Figure 17:
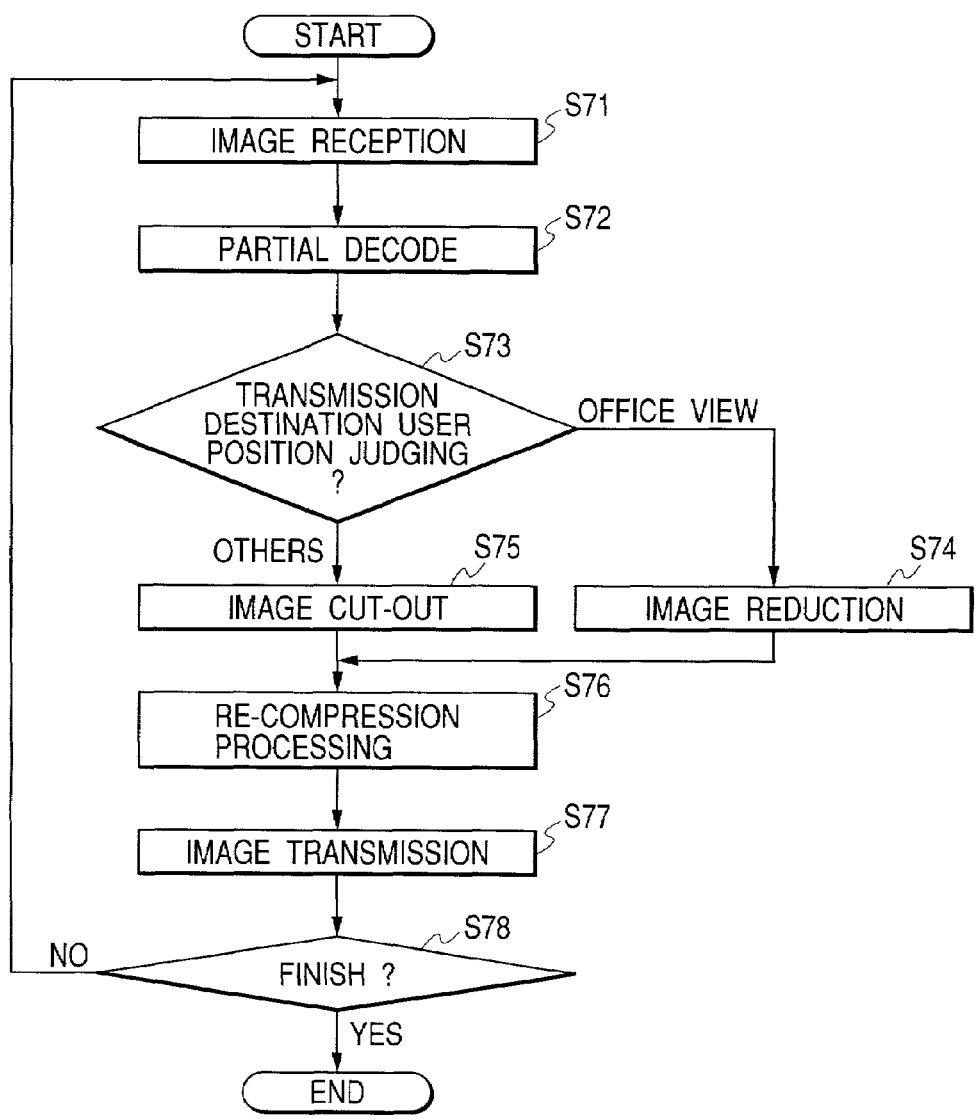
FIG. 17 is a flow chart showing the operations of the host server apparatus 12 corresponding to FIG. 16.
Figure 18:
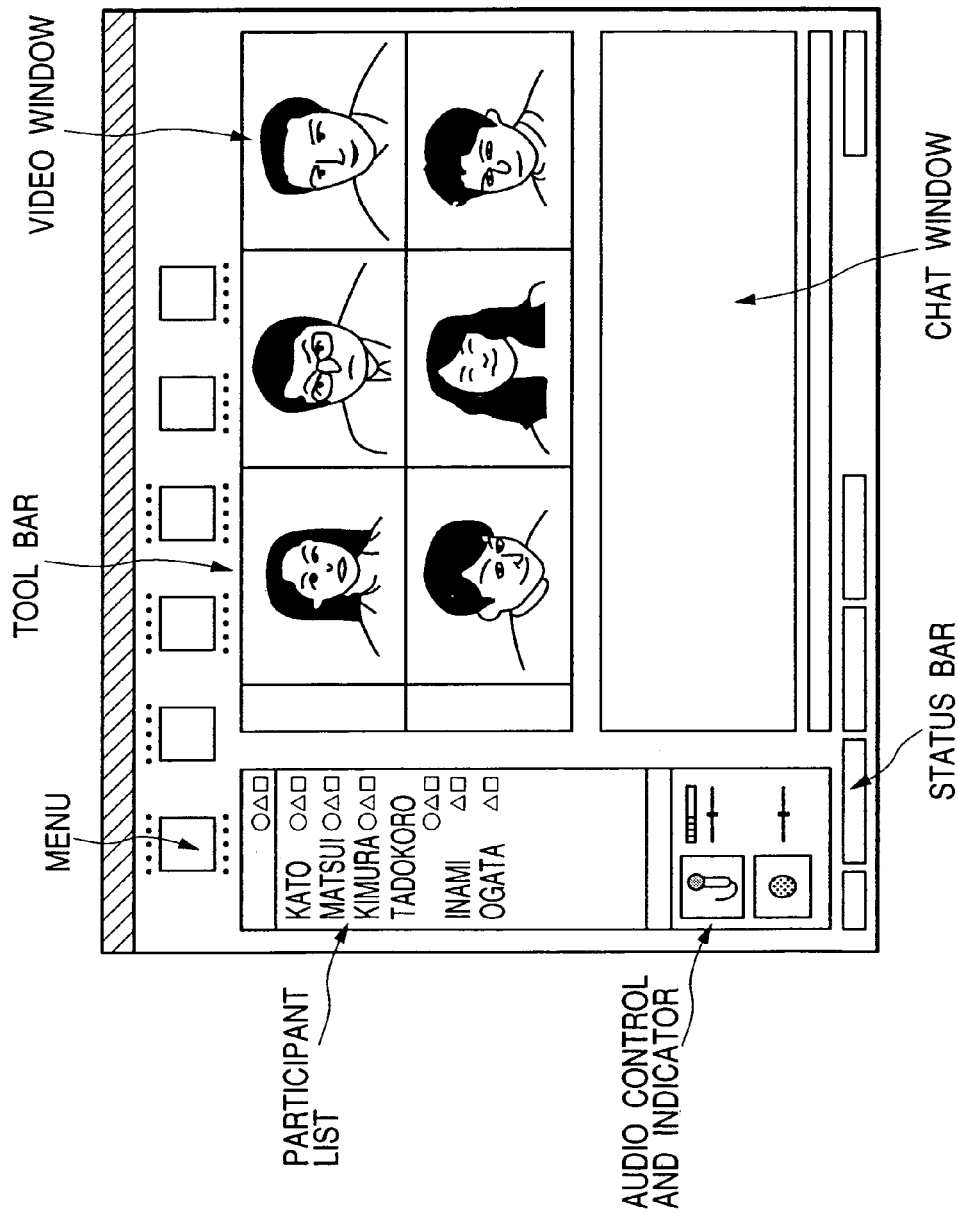
FIG. 18 is a view showing an example of a client image in a conventional multi-spot video conference system.

In the example shown in FIG. 15, the image compression rate is changed by the host server apparatus 12 according to the user position of the transmitting terminal, but it is also possible that the server apparatus 12 reduces the image size in case of the office view but cuts out a desired partial image (for example a portion of the user face) in other cases. FIG. 16 is a flow chart showing the operations of the client in such variation, and FIG. 17 is a flow chart showing the operation of the host server apparatus 12.

The image taken by each video camera 42 is taken into the main body 70 of the computer by a video input device thereof, as image data of QCIF format (176 ×144 pixels) (S61). The fetched image data are compression encoded by an image encoding method such as JPEG or H.263 (S62), and are transferred through the network to the host server apparatus 12 (S63).

The host server apparatus 12 receives the image transmitted from the client (S71), and executes partial expansion (S72). For example, in case of the image data compressed by the JPEG method, the decoding is executed by Huffman decoding and inverse DCT to the DCT coefficients. Then the host server apparatus 12 judges the position of the user of the transmitting terminal in the virtual space (S73).

In case the user of the transmitting terminal is present in the office view (S73), namely if the user utilizes the present system in the interactive awareness mode, the image size is reduced by deleting a part of the DCT coefficients according to the image size on the communication channel, in order to transmit the full scene showing the user state (S74). For example, the reduction is made to the QCIF format (176 ×144 pixels), corresponding to the image shown in FIG. 10B.

On the other hand, in case the user is present in the conference room (S73), an area principally consisting of the user face is cut out from the received image data (S75). The cut-out area may be determined in advance, or may be cut out automatically utilizing the face recognition technology explained in the foregoing. The cut-out image data are outputted with the QCIF format, corresponding to the image shown in FIG. 10C.

The size-reduced image (S74) or the cut-out image (S75) is quantized, then recompressed (Huffman encoding) (S76) and distributed to the user terminal through the network (S77).

The user terminal receives the images of other users from the host server apparatus 12 (S64), expands the image data of such images (S65) and displays them on the display apparatus 44 (S66).

The user terminal repeats the process of the foregoing steps S61 to S66 until the user instructs the end of the process (S67). The host server apparatus 12 repeats the process of the foregoing steps S71 to S76 until the user instructs the end of the process (S77).

In the operations shown in FIGS. 16 and 17, the host server apparatus 12 changes the image size or compression rate of the image data in adaptive manner according to the user position in the virtual space. For example, the host server apparatus 12 distributes the full scene image in case the user utilizes the interactive awareness function, but distributes the image principally showing the user face in case of the conference in the virtual conference room. Therefore, the user receives the image of other users as a rough image in case of utilizing the interactive awareness function, and the high definition images of other users in case of the virtual conference. In this manner, it is rendered possible to understand the state of other users in case of the awareness mode, and the images principally composed of faces, enabling to understand the expression, in case of the function mainly for communication such as the conference.

The cutting out of the image by the server 12 allows to distribute optimum image data to each user. More specifically, it is possible to distribute the image data principally composed of the face only to the user present in the conference room and to distribute the full-scene image, including the images of other users present in the conference room, to the user present in the office view.

The control by the server for the area or quality of the image to be distributed according to the position in the virtual space allows to realize the necessary image distribution with suitable range and quality, while achieving effective utilization of the communication band.

Also the control of the camera itself, such as the direction or zooming thereof, according to the position in the virtual space, is advantageous for providing the image of higher quality. In distributing for example a magnified image, there is required electronic enlargement or cut-out if the image taking position or the zooming cannot be controlled, leading to a lower image quality with a reduced number of pixels. On the other hand, the control on the image taking position or the zooming allows to reduce the electronic image processing and to provide higher image quality.

In the foregoing, the JPEG and H.263 encoding methods have been cited as the examples of the image compression encoding method, but such examples are not restrictive and there may be employed various image compression encoding methods.

Also there have been explained the office view corresponding to a virtual large space as an example of the space utilizing the interactive awareness function and the virtual conference room as an example of the space realizing the active communication, but the present invention is not limited to such examples and can adapt to various functions. For example, there can be conceived a training room, a resting room or a library virtually constructed on the network, as functions for realizing the active communication.

Also not only to the office space, the present invention is applicable to communication spaces of other purposes such as a communication tool for a hobby group.

It is furthermore possible to adopt an image distributing method in which the image working methods and the camera selecting methods explained in the foregoing are suitably combined. For example, it is possible to flexibly adapt to various needs of the users by allowing a manager to arbitrarily select the selection of such methods.

In the foregoing there have been explained cases where the operation of the user terminal is realized by the software on the personal computer. However the present invention is not limited to such cases. It is for example possible to construct the display apparatus as a stand-alone exclusive terminal and to connect it independently to the network. In such case, various signal processings and communication processes of the user side are all executed in such terminal.

The present invention also includes a case where program codes of a software realizing the functions of the aforementioned embodiments are supplied to a computer of an apparatus or a system connected to various devices so operating such devices as to realize the functions of the aforementioned embodiments and the computer (CPU or MPU) of such apparatus of system operate the aforementioned devices according to the supplied program.

In such case, the program codes themselves of the software realize the functions of the aforementioned embodiments, and the program codes themselves or the means for supplying the computer with the program codes, for example the memory medium storing the program codes, constitute the present invention. The memory medium storing the program codes can be, for example, a floppy disk, a hard disk, an optical disk, a magnetooptical disk, a CD-ROM, a magnetic tape, a non-volatile memory card or a ROM.

The present invention naturally includes such program codes not only in a case where the functions of the aforementioned embodiments are realized by the execution of the supplied program codes by the computer but also in a case where the program codes realize the functions of the aforementioned embodiments in cooperation with the OS (operating system) functioning on the computer or other application softwares.

Furthermore, the present invention includes a case where the supplied program codes are once stored in a memory provided in a function expansion board of the computer or in a function expansion unit connected thereto and a CPU or the like provided in such function expansion board or function expansion unit executes all the processes or a part thereof according to the instruction of the program codes thereby realizing the functions of the aforementioned embodiments.

As will be easily understood from the foregoing description, the present invention can realize optimum image distribution according to the state of use of the users, in a virtual office system or the like to be utilized in a dispersed work environment such as works at home or satellite offices.

Also the present invention allows to distribute the necessary image information with appropriate area and image quality, while effectively utilizing the communication band, by controlling such area or image quality of the image to be distributed at the server side.

Also the control of the camera itself, such as the direction or zooming thereof, according to the position in the virtual space, is advantageous for providing the image of higher quality.

The present invention is not limited to the foregoing embodiments but is subject to various modifications within the scope and spirit of the appended claims.

What is claimed is:

1. An image distribution system in a virtual space system composed of terminal apparatuses respectively provided at plural users and a server apparatus connected to the terminal apparatuses through a communication channel for constructing a virtual space for distributing an image among the terminal apparatuses, wherein each of the terminal apparatuses comprises:

display means for displaying one of a first virtual area to show a condition of each of the plural users with respective images and text and a second virtual area to have a conference in a screen;

image obtaining means for obtaining the respective images of the plural users;

image compression means for compressing image data with a quantization coefficient, determining means for determining whether each of the respective images of the plural users obtained by said image obtaining means is arranged in the first virtual area or in the second virtual area;

control means for controlling said image compression means to make compressed image data by compressing data of the respective images of the plural users with a first quantization coefficient in case that each of the respective images of the plural users obtained by said image obtaining means is arranged in the first virtual area or by compressing data of the respective images of the plural users with a second quantization coefficient smaller than the first quantization coefficient in case that the respective images of the plural users obtained by said image obtaining means is arranged in the second virtual area; and transmission means for transmitting the compressed image data of the respective images of the plural users to the server apparatus.

2. The system according to claim 1, wherein said image obtaining means includes size conversion means for converting a size of the respective obtained images, and cut-out means for cutting out a predetermined area from the respective obtained images, and said control means selects an output of the size conversion means or the cut-out means according to an area where each of the respective images of the plural users is arranged.

3. The system according to claim 1, wherein said image obtaining means includes image pickup means for converting an optical image into an electrical signal and image pickup control means for controlling an area and a direction to pick-up the optical image by the image pickup means; and said control means controls the image pickup area of the image pickup means through the image pickup control means according to an area where each of the respective images of the plural users is arranged.

4. The system according to claim 1, wherein said image obtaining means includes plural image pickup means for converting an optical image into an electrical signal; and said control means selects one of the outputs of the plural pickup means according to an area where each of the respective images of the plural users is arranged.

5. An image distribution system in a virtual space system composed of terminal apparatuses respectively provided at plural users and a server apparatus connected to the terminal apparatuses through a communication channel for constructing a virtual space including a first virtual area to show a condition of each of the plural users with respective images and text and a second virtual area to have a conference for distributing an image among the terminal apparatuses, wherein each of the terminal apparatuses comprises:

image obtaining means for obtaining the respective images of the plural users;

transmission means for transmitting the respective images obtained by said image obtaining means, to the server apparatus; and reception display means for receiving and displaying the respective images in the respective terminal apparatuses transmitted from the server apparatus; and wherein the server apparatus comprises:

image process means for processing the respective images transmitted from each of the respective terminal apparatuses;

determining means for determining whether each of the respective images of the plural users is arranged in the first virtual area or in the second virtual area;

control means for controlling said image process means to make compressed image data by compressing data of the respective images of the plural users with a first quantization coefficient in case that each of the respective images of the plural users are arranged in the first virtual area or by compressing data of the respective images of the plural users with a second quantization coefficient smaller than the first quantization coefficient in case that the respective images of the plural users obtained by said image obtaining means are arranged in the second virtual area; and distribution means for distributing the compressed image data.

6. The system according to claim 5, wherein said image process means includes recompression means for recompressing image data, and said control means controls a compression parameter at the recompression means, according to an area where each of the respective images of the plural users is arranged.

7. The system according to claim 5, wherein said image process means includes size conversion means for converting the size of the respective images and cut-out means for cutting out a predetermined area from the respective images; and said control means selects the output of the size conversion means or the cut-out means according to an area where each of the respective images of the plural users is arranged.

8. An image distribution method in a virtual space system composed of the terminal apparatuses respectively provided at plural users and a server apparatus connected to the terminal apparatuses through a communication channel for constructing a virtual space including a first virtual area to show a condition of each user of the plural users with respective images and text and a second virtual area for distributing an image among the terminal apparatuses, said method comprising the steps of:

determining whether each of the respective images of the plural users is arranged in the first virtual area or in the second virtual area;

making compressed image data by compressing data of the respective images of the plural users with a first quantization coefficient in case that the respective images of the plural users are arranged in the first virtual area or by compressing data of the respective images of the plural users with a second quantization coefficient smaller than the first quantization coefficient in case that the respective images of the plural users obtained in the determining step are arranged in the second virtual area; and distributing the compressed image data.

9. The method according to claim 8, wherein said server apparatus recompresses data with a recompression parameter according to an area where each of the respective images of the plural users is arranged.

10. The method according to claim 8, wherein said server apparatus applies either of image size conversion and predetermined area cutting-out to image data according to an area where each of the respective images of the plural users is arranged.

11. An image distribution method in a virtual space system composed of terminal apparatuses respectively provided at plural users and a server apparatus connected to the plural terminal apparatuses through a communication channel for constructing a virtual space including a first virtual area to show a condition of each of the plural users with respective images and text and a second virtual area to have a conference for distributing an image among the terminal apparatuses, wherein said method comprises the steps of:

obtaining the respective images of the plural users;

determining whether each of the respective images of the plural users is arranged in the first virtual area or in the second virtual area;

making compressed image data by compressing data of the respective images of the plural users with a first quantization coefficient, in case that each of the respective images of the plural users obtained in said step of obtaining the respective images of the plural users is arranged in the first virtual area or by compressing data of the respective images of the plural users with a second quantization coefficient smaller than the first quantization coefficient in case that each of the respective images of the plural users obtained in said step of obtaining the respective images of the plural users is arranged in the second virtual area; and transmitting the compressed image data of the respective images of the plural users to the server apparatus.

\* \* \* \* \*